United States Patent [19]

Kuroda

[11] Patent Number: 5,502,572
[45] Date of Patent: Mar. 26, 1996

[54] VARIABLE SPEED VIDEO SIGNAL REPRODUCING APPARATUS

[75] Inventor: Kazuo Kuroda, Tokorozawa, Japan

[73] Assignee: Pioneer Electronic Corporation, Tokyo, Japan

[21] Appl. No.: 221,267

[22] Filed: Mar. 31, 1994

Related U.S. Application Data

[63] Continuation of Ser. No. 988,249, Dec. 9, 1992, abandoned.

[30] Foreign Application Priority Data

Dec. 18, 1991 [JP] Japan ................................. 3-335253

[51] Int. Cl.$^6$ .................................................... H04N 5/76
[52] U.S. Cl. ............................................ 358/335; 358/342
[58] Field of Search ................................. 358/335, 342, 358/710, 712; 360/10.1, 10.3, 72.3, 73.01, 73.05, 73.08, 11.1

[56] References Cited

U.S. PATENT DOCUMENTS 5,126,852  6/1992  Nishino et al. ......................... 358/335
5,179,451  1/1993  Takeshita et al. ...................... 358/335

Primary Examiner—Tommy P. Chin
Assistant Examiner—Robert Chevalier
Attorney, Agent, or Firm—Kane, Dalsimer, Sullivan, Kurucz, Levy, Eisele and Richard

[57] ABSTRACT

A video signal reproducing apparatus including unit for receiving field image signals corresponding to one of first and second field, unit for detecting successive receipt of field image signals corresponding to same field, and unit for alternately scanning the field image signals corresponding to the first field at scanning position of the first field and the field image signals corresponding to the second field at scanning position of the second field. The scanning unit successively scans the field images corresponding to the same field at the same scanning positions when the successive receipt detecting unit detects the successive receipt of the field image corresponding to the same field.

11 Claims, 12 Drawing Sheets

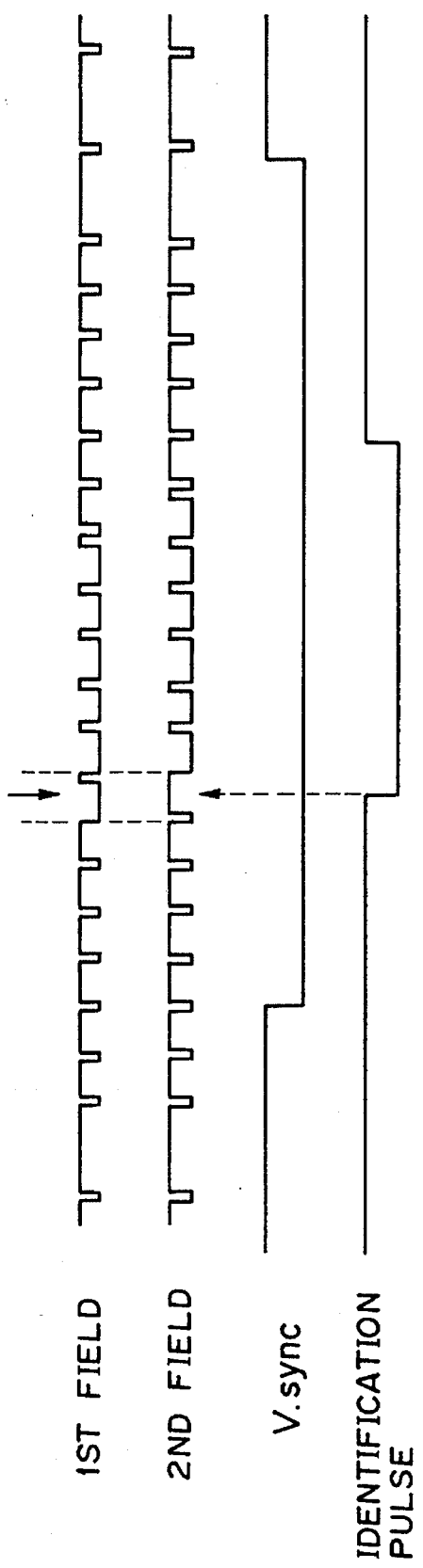

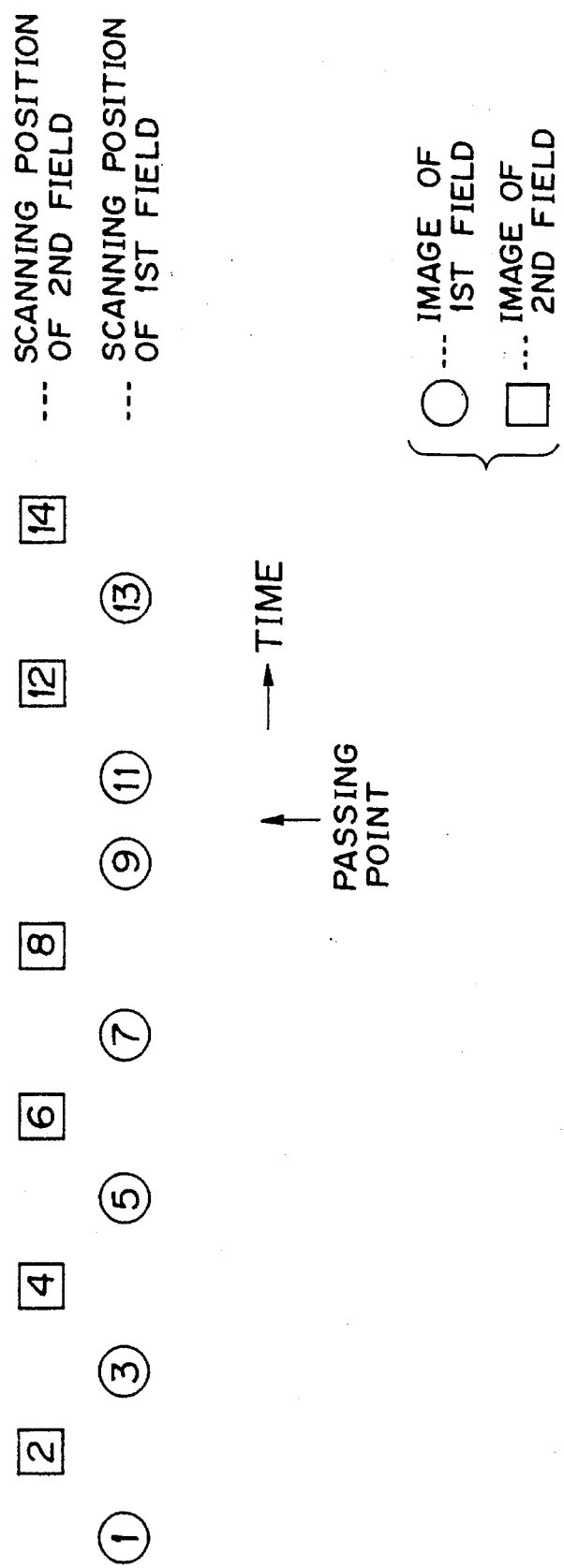

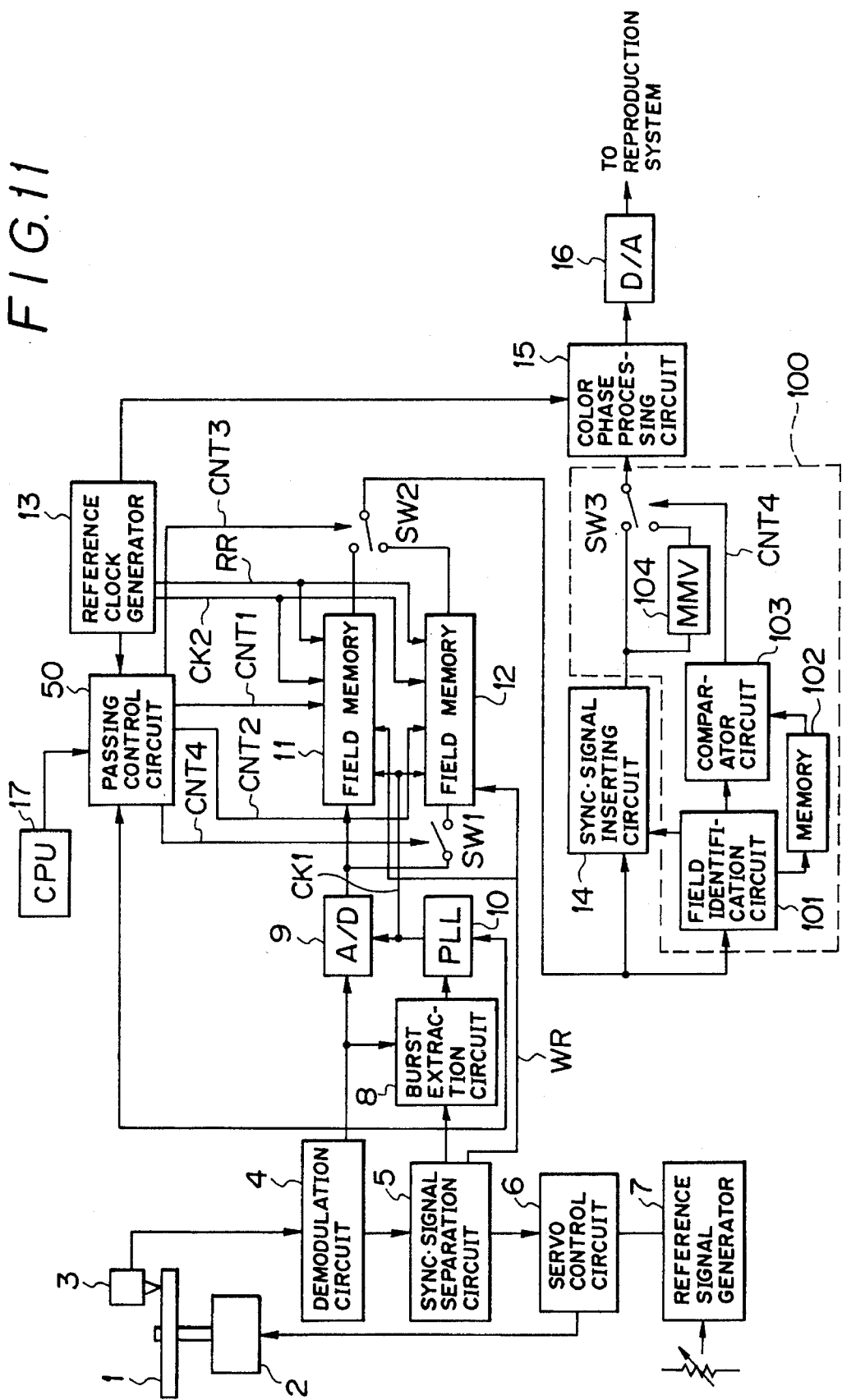

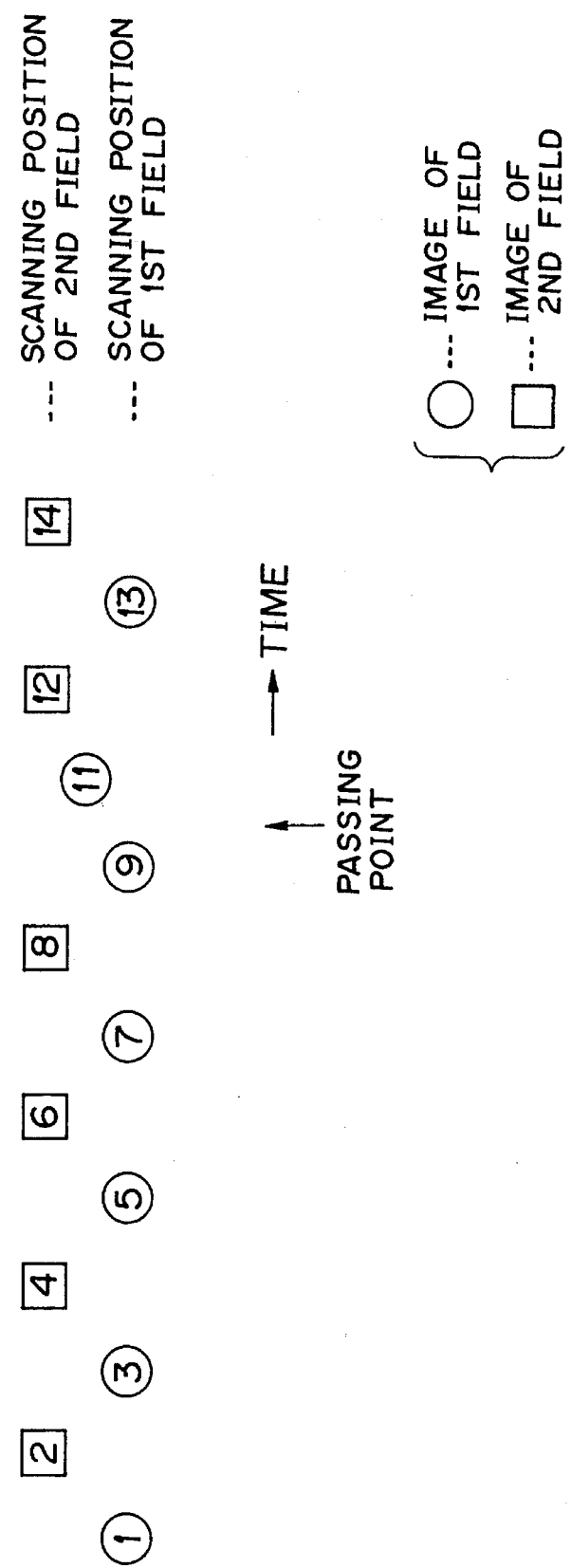

VARIABLE SPEED VIDEO SIGNAL REPRODUCING APPARATUS

This application is a continuation of application Ser. No. 07/988,249, file Dec. 9, 1992, now abandoned.

BACKGROUND OF THE INVENTION

1. Field of the Invention

The present invention relates to a video signal reproducing apparatus, such as an LD (Laser Disk Player) or a VTR (Video Tape Recorder), and more particularly to a video signal reproducing apparatus which uses a video memory and can reproduce images having a little deterioration in a variable speed reproduction mode.

2. Description of the Prior Art

In a variable speed reproduction mode, such as a slow or quick mode, of a video signal reproducing apparatus, such as an LD, an image signal is reproduced in such a manner that track jump is performed so as to output an identical frame twice, or the reading skips over an intermediate frame. However, the above variable speed reproduction has a disadvantage in that a periodical abnormality of voice reproduction occurs because identical voice signals are successively output twice or an intermediate part of voice signal is skipped in the same manner as the image signal.

A method using a field memory is known that is intended to eliminate the above disadvantage. This method uses a video memory having a capacity of at least one field of video signal. A read clock applied to the video memory is fixed at a frequency. A reference synchronizing signal with respect to a reproduced video signal from the LD or the like (for example, a reference synchronizing signal for spindle servo) is made variable. The reproducing speed of the reproduced video signal (for example, the revolution velocity of the laser disk) is varied by changing the frequency of the reference synchronizing signal. According to the above method, when the reproducing speed of the LD is changed, video signals are written into the field memory in synchronism with a write clock dependent on a change in the reproducing speed, while the written video signals are read therefrom in synchronism with the read clock having the fixed frequency. In this manner, the video signal and the audio signal can be correctly reproduced.

There is a phenomenon, called "passing", in the variable speed reproduction. This is due to the fact that the frequency of the write clock and the frequency of the read clock differ from each other. When the frequency of the write clock is higher than that of the read clock, the time relation between the write clock and the read clock is reversed, and the write timing passes (outruns) the reading timing (see time relation of V.RESET signals in FIG. 6). On the other hand, when the frequency of the write clock is lower than that of the read clock, the read timing passes the write timing (see time relation of V.RESET signal in FIG. 8). When the passing takes place, upper and lower portions of the field image becomes different from each other because of the passing. In practice, as the contents of successive field images are similar to each other, a particular countermeasure is not employed.

A frame synchronizer can also handle the passing phenomenon as mentioned above. The frame synchronizer is a device that synchronizes two video signals with each other. Normally, the reproduced video signals in various video reproduction apparatuses may have different frequencies within a standard. One of the video signals is written into the frame memory in synchronism with the frequency thereof, and is read therefrom in synchronism with the frequency synchronized with the other video signal.

An application device of the frame synchronizer uses a field memory. However, the following problems arise from passing in such an application device. Normally, the frame synchronizer with the field memory only stores image data in the field memory, and a synchronizing signal is added to the image data read out from the field memory. When passing has occurred, writing of one field image data is prevented or image data of the same field is successively read twice, in correspondence with the difference between the memory write speed (frequency) and the memory read speed. Hence, an image of the same field (the first field or the second field) is successively read from the memory twice. In this case, when the synchronizing signal is added to the output signal from the memory, a field reversal occurs. That is, the images of the first field are scanned at the scanning position of the second field and the images of the second field are scanned at the scanning position of the first field, as shown in FIG. 1. With the above in mind, in the frame synchronizer, the reading of a field image from the memory after passing is delayed by one line, and the synchronizing signal is added to the delayed field image. With this operation, the field image after the passing is scanned at the scanning position one line below the respective fields as shown in FIG. 2, it is possible to prevent reversal of the relation between the scanning positions of the first and second fields.

The general frame synchronizers are applied to cases where the difference between the frequencies of the two signals is approximately within ±1 percent. Therefore, passing occurs at a long period and the swinging of displayed images resulting from the above-mentioned scanning position control is not so considerable.

However, in devices having a variable speed reproduction function such as a Laser Karaoke, considerable swinging of display images frequently takes place because the difference between the frequencies of the memory write clock and the memory read clock is approximately ±10 percent.

SUMMARY OF THE INVENTION

It is an object of the present invention to provide a video signal reproducing apparatus in which quality of reproduced images, are improved under a variable speed reproduction mode.

According to one aspect of the present invention, there is provided a video signal reproducing apparatus including an unit for receiving field image signals corresponding to one of first and second field, an unit for detecting successive receipt of field image signals corresponding to same field, and an unit for alternately scanning the field image signals corresponding to the first field at scanning position of the first field and the field image signals corresponding to the second field at scanning position of the second field. The scanning unit successively scans the field images corresponding to the same field at the same scanning positions when the successive receipt detecting unit detects the successive receipt of the field image corresponding to the same field.

According to another aspect of the present invention, there is provided a video signal reproducing apparatus including an unit for receiving field image signals corresponding to one of first and second field, an unit for detecting successive receipt of field image signals corresponding to same field, and an unit for alternately scanning the field image signals corresponding to the first field at scanning position of the first field and the field image signals corresponding to the second field at scanning position of the second field. The scanning unit scans one of the successive field images corresponding to the same field at intermediate position of the scanning positions of the first field and second field when the successive receipt detecting unit detects the successive receipt of the field image corresponding to the same field.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 9 is a diagram showing a field identification process;

FIG. 10 is a diagram showing scanning positions of the field images according to the first embodiment of the present invention;

FIG. 11 is a diagram showing a construction of a second embodiment of the present invention; and FIG. 12 is a diagram showing scanning positions of the field images according to the second embodiment of the present invention.

DESCRIPTION OF THE PREFERRED EMBODIMENTS

Figure 1:
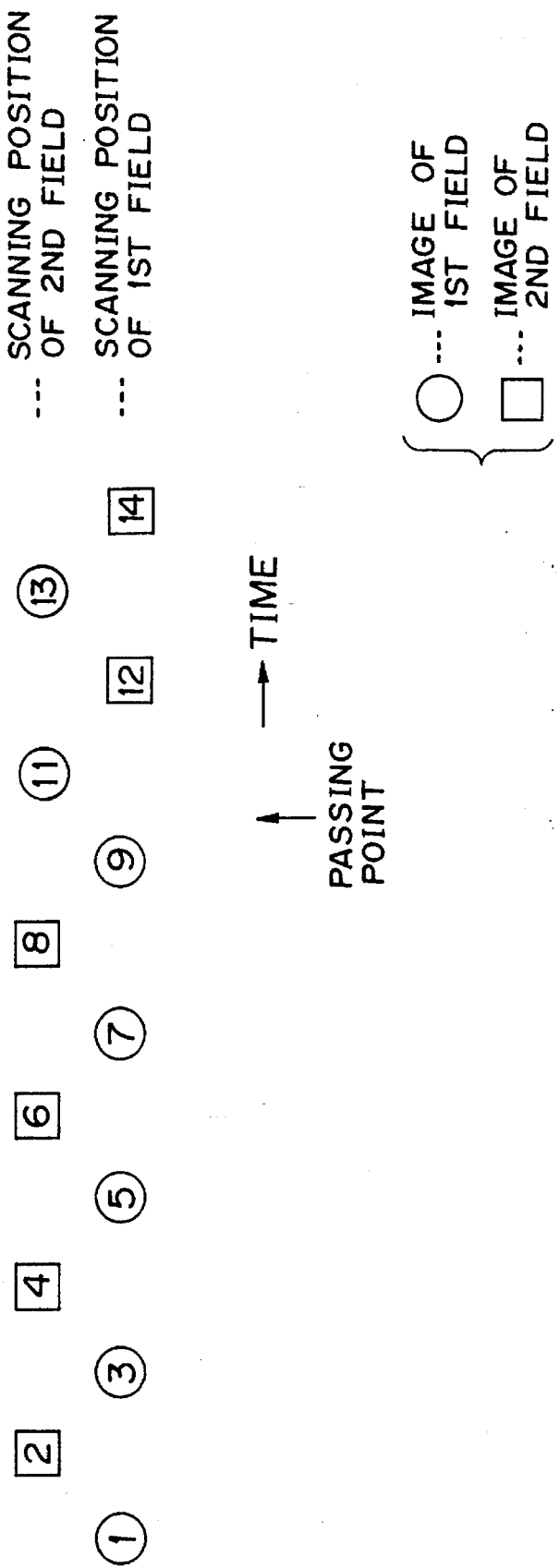
FIG. 1 is a diagram showing scanning positions of field images.
Figure 2:
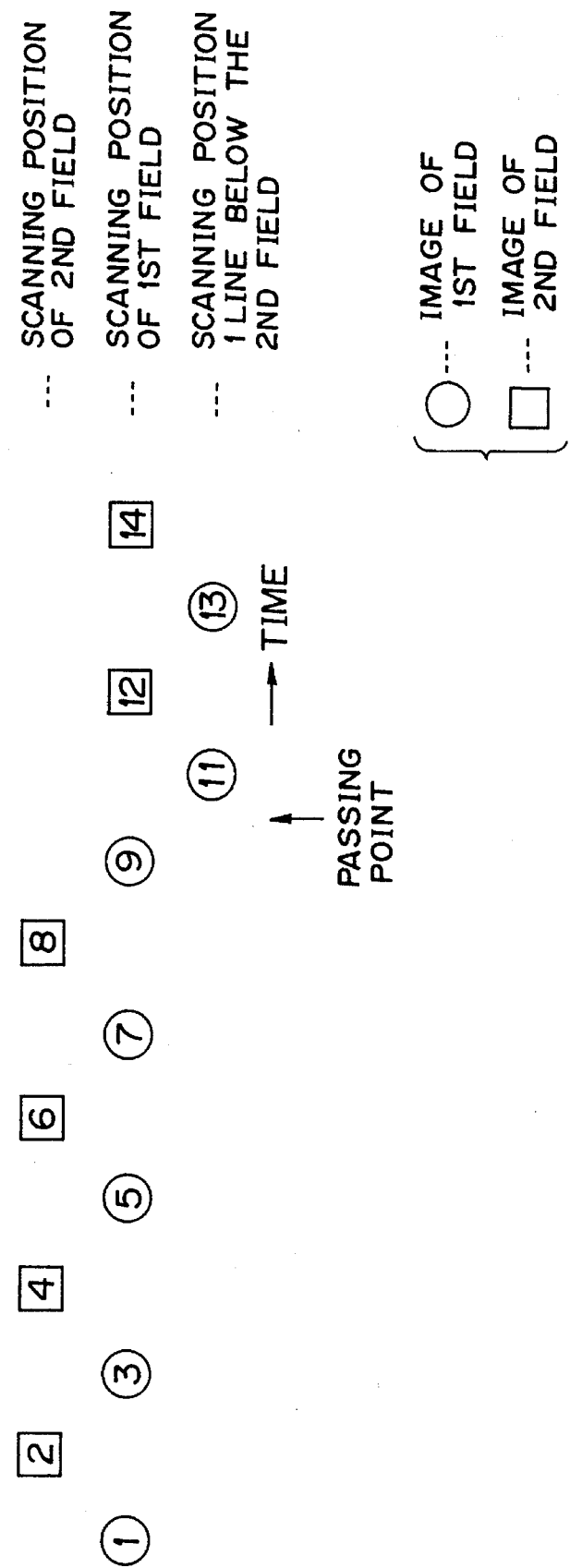
FIG. 2 is a diagram showing scanning positions of field images in the frame synchronizer.
Figure 3:
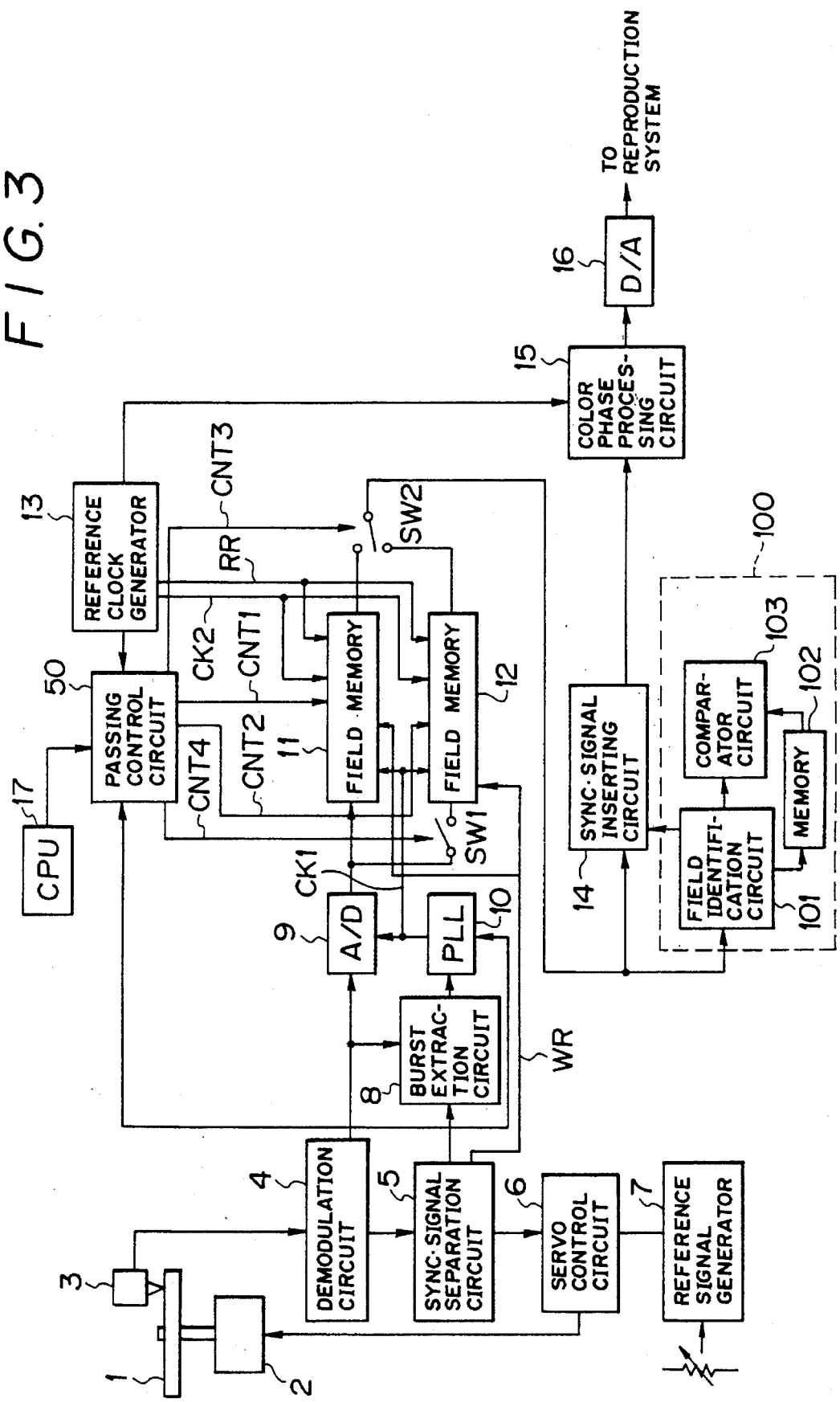
FIG. 3 is a block diagram showing a construction of a first embodiment of the present invention.

A description will now be given, with reference to FIG. 3, of a first embodiment of the present invention.

An operation of a video signal reproducing apparatus according to the present invention is roughly described as follows. Video information recorded on a disk 1 is read by an optical pickup 3, and is converted into a demodulation circuit 4. Then, the video signal is input to an A/D converter 9. A digital video signal output from the A/D converter 9 is temporarily stored in field memories 11 and 12. Then, the video signals are read from the field memories 11 and 12 in synchronism with a reference clock Generated by a reference clock Generator 13. A synchronizing signal is added to the read-out video signals by a synchronizing signal inserting circuit 14. The video signal with the synchronizing signal added thereto is applied to a color phase processing circuit 15, which carries out a phase Processing for color (chroma) components of the video signal. An output signal of the color phase processing circuit 15 is converted into an analog video signal by a D/A converter 16, and is sent to a reproduction system.

Next, the details of the structural elements of the apparatus shown in FIG. 3 will be described. On the disk 1 is recorded music information and video information. The disk 1 is rotated by a spindle motor 2. The optical pickup 3 reads information from the disk 1 while the disk is being rotated. The read information is converted into a video signal by the demodulation circuit 4. The video signal from the demodulation circuit 4 is converted, by the A/D converter 9, into the digital video signal, which is stored in the field memories 11 and 12. Synchronizing signals are separated from the video signal by a synchronizing signal separation circuit 5, and are supplied to a servo control circuit 6. The servo control circuit 6 executes a rotation velocity control of the spindle motor on the basis of the separated synchronizing signals and a reference frequency signal Generated by a reference signal Generator 7. The oscillation frequency of the reference signal generator 7 is variable within a range of ±10 percent about a reference frequency (14.3 MHz) of a normal speed reproduction. The servo control is carried out so that the spindle motor 2 rotates in synchronism with the oscillation frequency of the reference signal generator 7. If the reference oscillation frequency is set to 16 MHz that is 10% higher than the normal velocity, the disk 1 rotates at the velocity of 16/14.3 times of the normal velocity and the reproduced video signal has a frequency of 16/14.3 times of the normal frequency.

The synchronizing signals separated from the video signal by the synchronizing circuit 5 are a vertical synchronizing signal (V.sync) and a horizontal synchronizing signal (H.sync). A WRITE V.RESET signal WR is generated from the vertical synchronizing signal V.sync, and is supplied to the field memories 11 and 12 as a write reset signal. The horizontal synchronizing signal H.sync is applied to a burst extraction circuit 8 and a PLL (Phase Locked Loop) 10. The PLL 10 generates a clock signal CK1 which is locked with a color burst of the reproduced video signal. The clock signal CK1 is input to the A/D converter 9 and the field memories 11 and 12.

Image data is written into the field memories 11 and 2 in synchronism with the clock signal corresponding to the frequency of the reproduced video signal (equal to the frequency of the reference signal generator 7), and the stored image data is read out from the field memories 11 and 12 in synchronism with the clock signal CK2 corresponding to the frequency of the reference clock generator 13 (14.3 MHz) and a READ V.RESET signal RR generated thereby. Hence the video signals read out from the field memories 11 and 12 are video signals having the normal frequency, and can be reproduced by an ordinary reproduction system. Normally, only the field memory 11 is used. The field memory 12 is used together with the field memory 11 when passing occurs (which will be described later).

Figure 4:
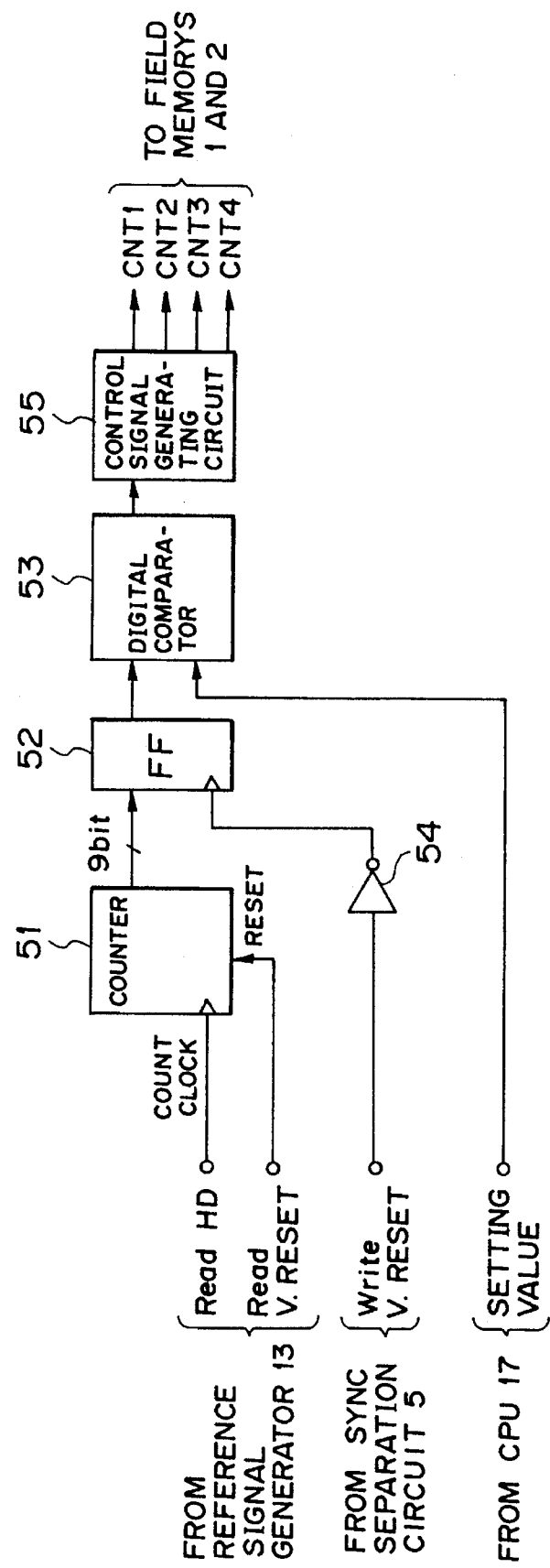
FIG. 4 is a diagram of a passing control circuit of the first embodiment according to the present invention.

If the frequencies of the write clock and the read clock are different from each other, the aforementioned passing takes place. A passing control circuit 50 executes a passing control. As shown in FIG. 4, the passing control circuit 50 includes a counter 51, a flip-flop (FF) 52, a digital comparator 53, an AND circuit 54, and a control signal generating circuit 55. The passing control circuit 50 operates as follows. The counter 51 is reset by the READ V.RESET signal, and counts the number of READ.HD (H. sync) pulses. The count value of the counter 51 is supplied to the FF 52 which latches the count value of the counter 51 in synchronism with the edge of the WRITE V.RESET signal. The latched count value is output to the digital comparator 53 which compares the count value with a predetermined value set by a CPU 17. The comparison result is input to the control signal generating circuit 55 which generates control signals CNT1 to CNT4 based on the comparison result.

Figure 5:
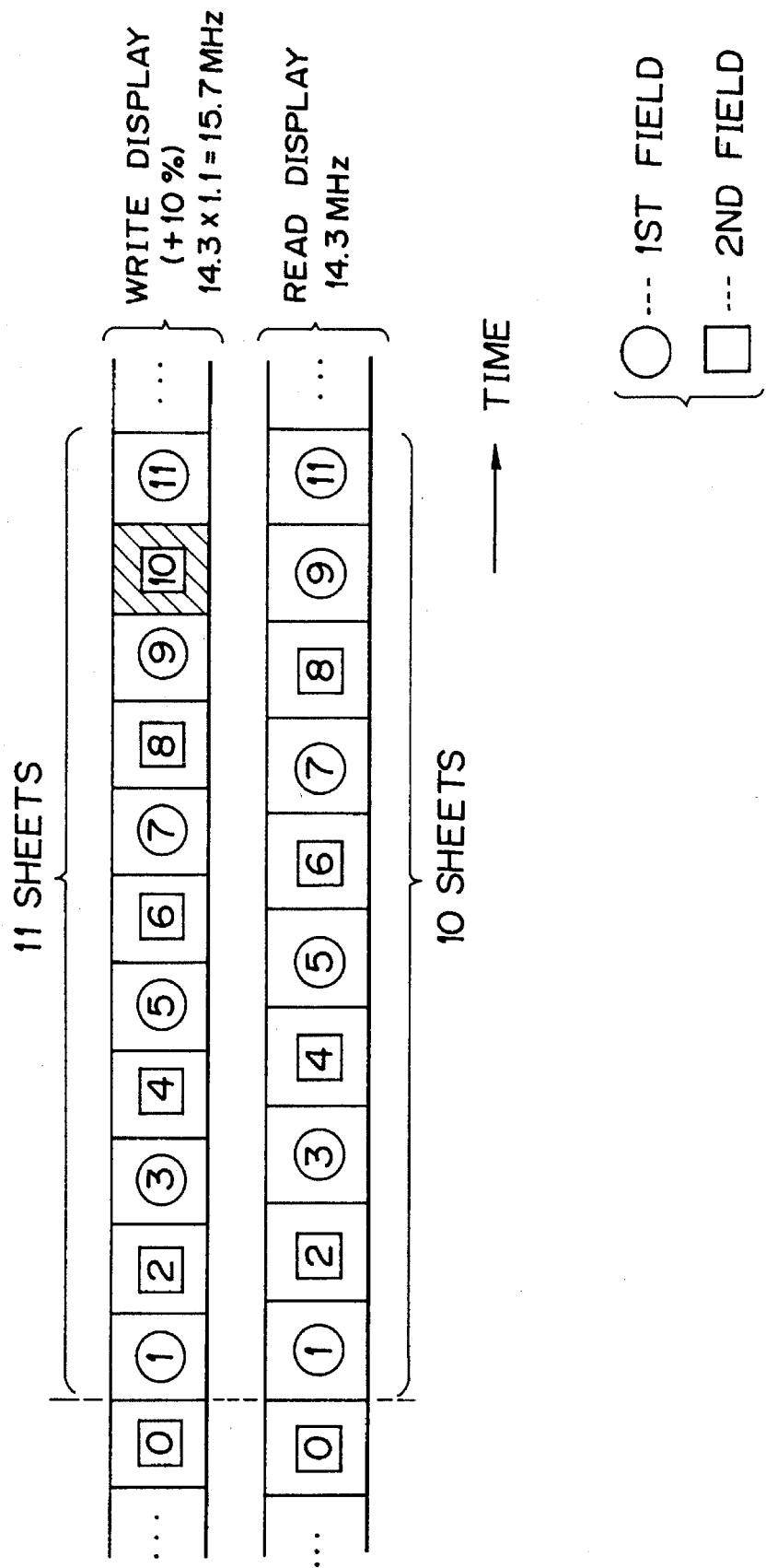
FIG. 5 is a diagram showing an operation of the passing control.
Figure 6:
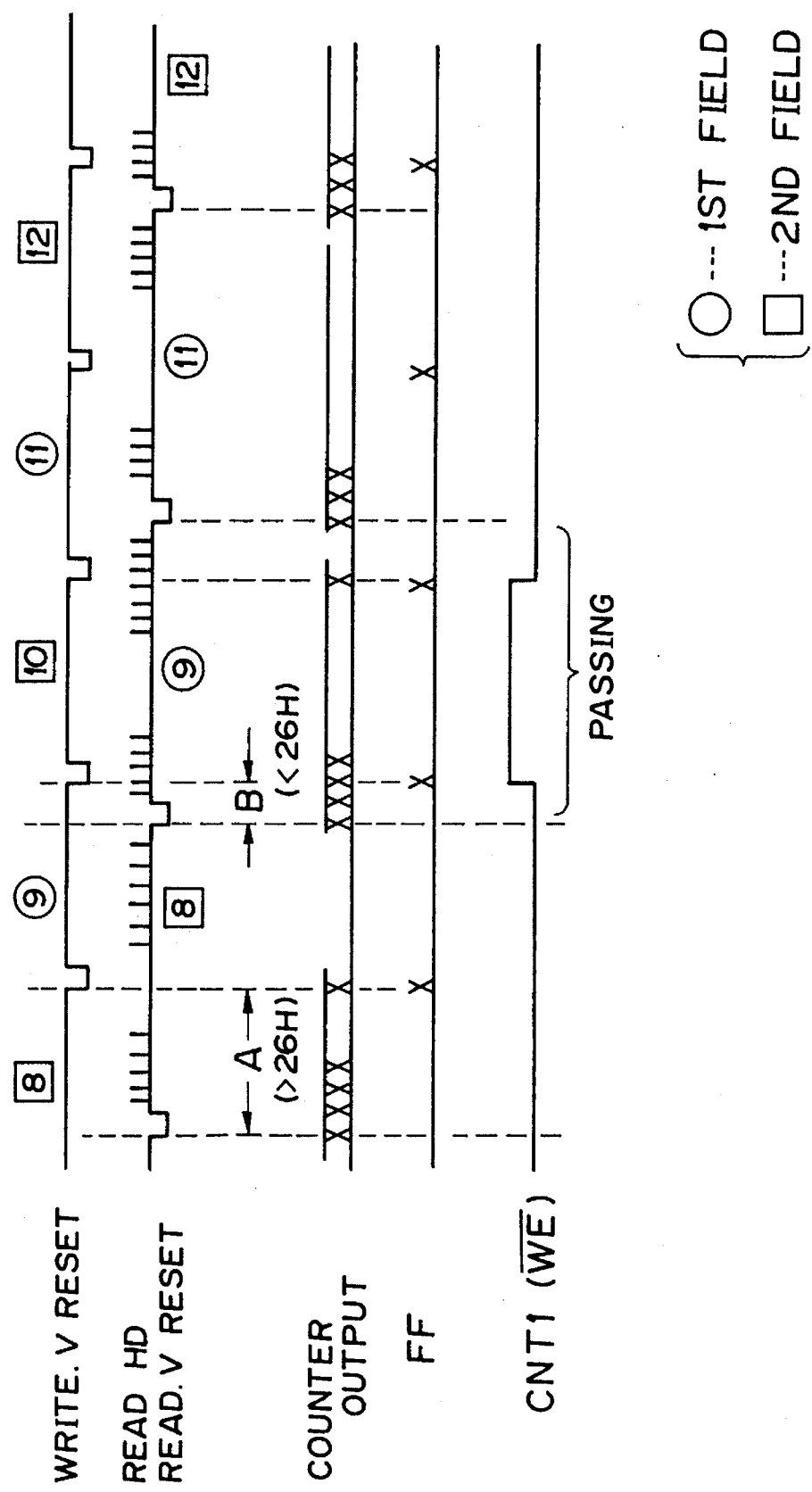
FIG. 6 is a timing chart showing an operation of passing control.

By way of example, a description will be given, with reference to FIGS. 5 and 6, of a case where the frequency of the reference signal generator 7 is set to 10 percent higher than the normal frequency. In this case, the write clock is at a frequency of 15.7 MHz, which is an approximately 10percent higher than the normal frequency (read clock). Hence, data written into the field memories 11 and 12 at the frequency of 15.7 MHz is read out therefrom at the frequency of 14.3 MHz. Accordingly, as shown in FIG. 5, only 10 field images can be read out from the field memory while 11 field images are written therein. Therefore, the writing of one of the 11 field images (e.g.,hatched portion in FIG. 5) is inhibited. In the above example, since the frequency of the write clock is 10 percent higher than that of the read clock, the passing takes place when the value of the counter 51 (the count value of the HD. from the READ.V reset to the WRITE.V reset) becomes equal to or smaller than 26. With the above in mind, the predetermined value by the CPU 17 is selected as follows:

[number of horizontal lines in one field (262.5)]×[frequency difference between the write clock and the read clock (10%=0.1)] =26.

That is, when the count value in the FF 52 becomes equal to or smaller than 26, the writing of the next one field (the tenth field in FIG. 6) is inhibited. More specifically, a write enable of the field memories 11 and 12 is set to a high level (CNT1) during the period. The above process eliminates a disadvantage in that a portion of a field image is replaced by another field image when passing has occurred. That is, field images of the same field (e.g., the first field in FIG. 6) are successively read out from the field memories.

Figure 7:
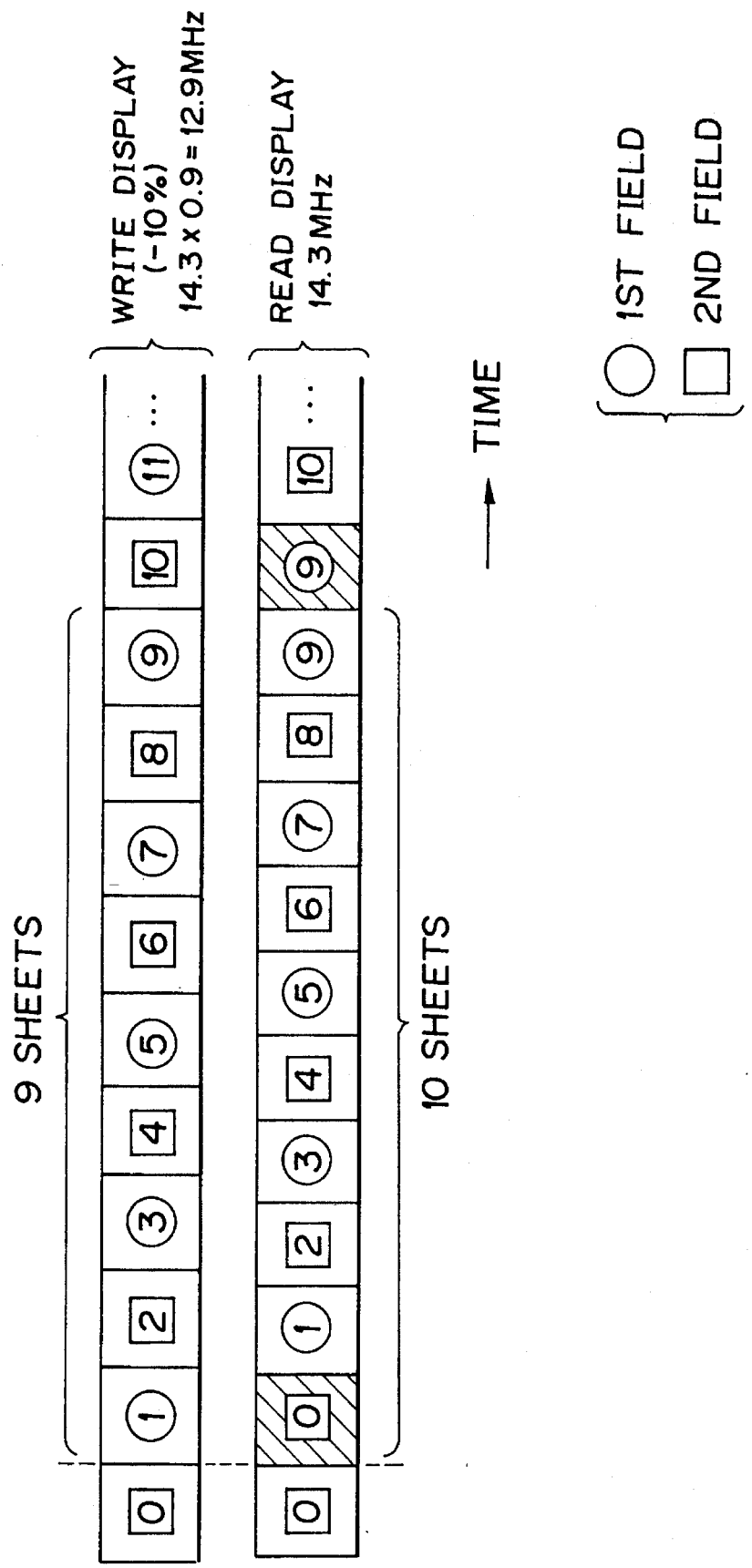
FIG. 7 is another diagram showing the operation of the passing control.
Figure 8:
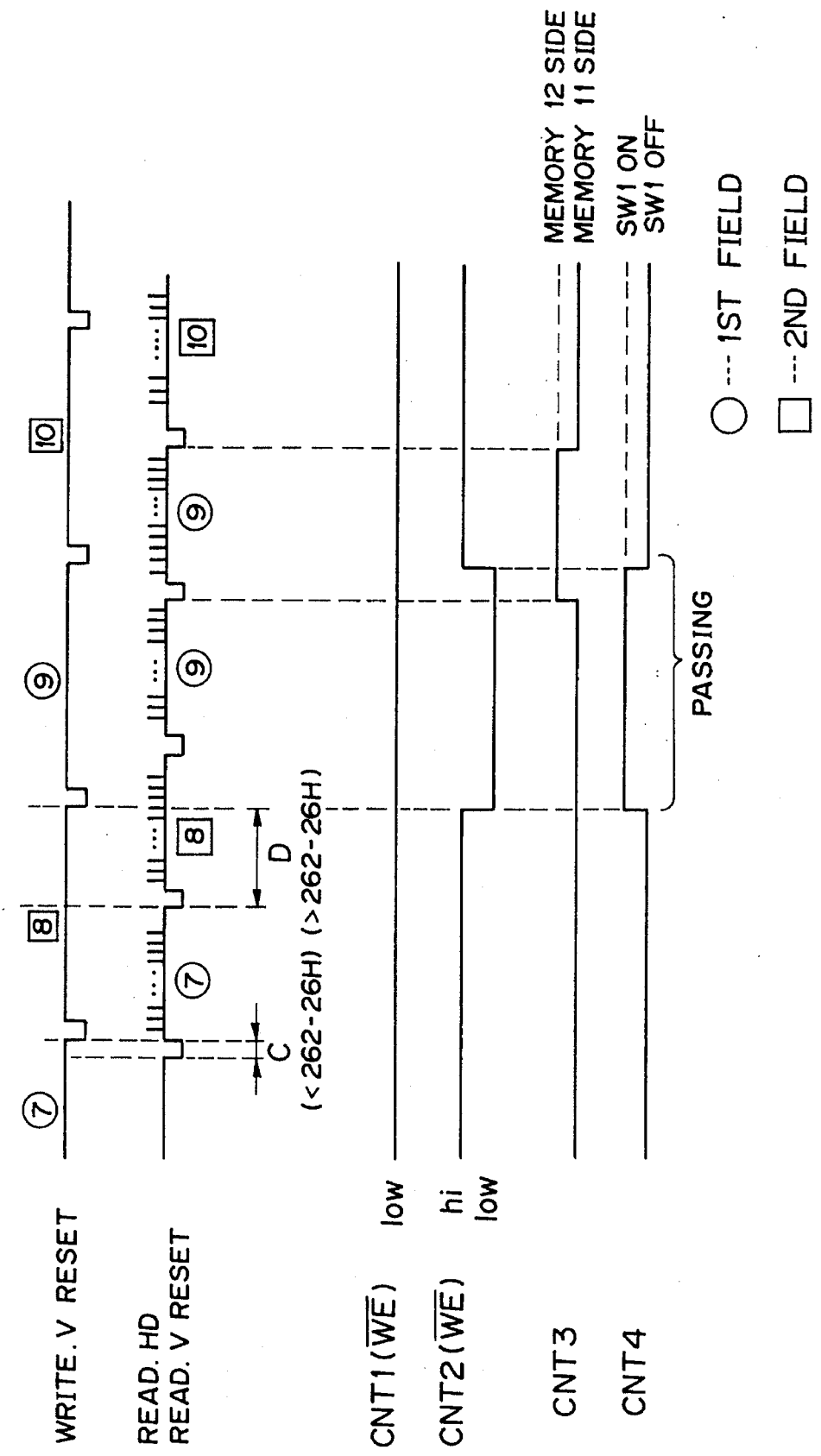
FIG. 8 is another timing chart showing the operation of the passing control.

Next, another example in which the frequency of the reference signal generator 7 is set to 10 percent lower than the normal frequency is described. In this case, the frequency of the write clock is 10 percent lower than the normal speed (i.e., read clock). Hence, image data written into the field memories 11 and 12 at the frequency of 12.9 MHz is read out therefrom at the frequency of 14.3 MHz. As shown in FIG. 7, only 9 field images can be written into the field memories 11 and 12 while 10 field images are read. Hence, one of the 9 field images (e.g., hatched portion in FIG. 7) is successively read twice. In this case, the setting value of the CPU 17is selected as follows:

[number of horizontal lines in one field (262.5)×[frequency difference between the write clock and the read clock (−10%=0.9)]= 232.

That is, when the count value in the FF 52 becomes equal to or large than 232, the next one field (the ninth field in FIG. 6) is written not only into the field memory 11 but also into the field memory 12. Then, the control signals CNT1 to CNT4 are generated so that the first one of the successive field images is read from the field memory 11, and the second one thereof is read from the field memory 12. In this manner, the field images of the same field are successively read out.

A description will now be given of the synchronizing signal inserting circuit 14 and a scanning position control circuit 100. The scanning position control circuit 100 includes a field identification circuit 101, a memory 102, and a comparator circuit 103. The field identification circuit 101 determines whether the field image is of the first or second field on the basis of the difference between the waveforms of the V.sync signals of the first and second fields, as shown in FIG. 9, for example. The field identification circuit 101 may operate according to another identification process. The field identification circuit 101 determines whether the field images output from the field memories 11 and 12 are of the first field or the second field, and the result of this determination is stored in the memory 102. The comparator circuit 103 compares the determination result output from the field identification circuit 101 with the determination result stored in the memory 102 (i.e., result of immediately before one field), and outputs the comparison result to the synchronizing signal inserting circuit 14.

Normally, the synchronizing signal inserting circuit 14 alternately inserts a first synchronizing signal corresponding to the scanning position of the first field and a second synchronizing signal corresponding to the scanning position of the second field to the field images output from the memories 11 and 12. When the scanning position control circuit 100 detects successive identical fields, the synchronizing signal inserting circuit 14 inserts the synchronizing signal corresponding to the scanning position of the same field (one of the first or second field). When the field images of first field are successively read out, like the hatched 9th field shown in FIG. 7, the first synchronizing signals corresponding to the scanning position of the first field are successively inserted to both of the successive field images. When the field images of the second field are successively read out, like the 0th field shown in FIG. 7, the second synchronizing signals corresponding to the scanning position of the second field are successively inserted to the successive field images. In this manner, field images of the first field are correctly scanned at the scanning position of the first field and the images of the second field are correctly scanned at the scanning position of the second field, as shown in FIG. 10. Hence, reproduced images do not swing even when the passing takes place.

A description will now be given of a second embodiment of the present invention. The video signal reproducing apparatus according to the second embodiment differs from the first embodiment shown in FIG. 3 in that a monomultivibrator (MMV) 104 and a switch SW3 are additionally provided in the scanning position control circuit 100. The other parts of the second embodiment are the same as corresponding parts of the first embodiment and a description thereof will be omitted. The MMV 104 is supplied with the field image signal with the synchronizing signal added thereto, and outputs a signal obtained by delaying the vertical synchronizing signal (V.sync) by ¼ line (HD). There is a ½-line shift between the vertical synchronizing signal corresponding to the first field and the vertical synchronizing signal corresponding to the second field. Hence, as shown in FIG. 12, the output image signal of the MMV 104 is scanned at an intermediate position between the first field and the second field. The switch SW3 switches to the synchronizing signal inserting circuit 14 side at normal state, and switches to the MMV 104 side when the comparator circuit 103 detects that field images of the identical field continues. In this manner, the second image of the successive fields (the 11th field image in FIG. 12) is scanned at the intermediate position between the first and second fields, so that the image quality can be further improved.

Alternatively, the first one of the successive field images (the 9th field image in FIG. 12) may be scanned at the intermediate position between the first and second fields, and the second field image may be scanned at the scanning position of the first field.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video signal reproducing apparatus for reproducing field image signals recorded on a first field of video signals and a second field of video signals on a recording medium comprising:

means for receiving from the recording medium the field video signals recorded on said first and second fields;

means for detecting successive receipt of the field image signals recorded on a same field; and means for normally alternately scanning the field image signals recorded on the first field at scanning positions of the first field and the field image signals recorded on the second field at scanning positions of the second field, wherein rather than alternating between said first field and said second field, said scanning means successively scans the field image signals of the same field at a same scanning position when the detecting means detects a successive receipt of a field image signal of the same field.

2. A video signal reproducing apparatus according to claim 1, wherein said scanning means comprises means for inserting one of a first synchronizing signal and a second synchronizing signal to said field image signals, said first synchronizing signal corresponding to the scanning position of the first field and said second synchronizing signal corresponding to the scanning position of the second field.

3. A video signal reproducing apparatus according to claim 1, wherein said detecting means comprises means for identifying whether one field image signal corresponds to said first or second field and means for comparing a field identification result of said one field image signal with a result Of that of an image signal immediately before said one field image signal.

4. A video signal reproducing apparatus according to claim 3, wherein said successive receipt detecting means further comprises a memory for storing the field identification result.

5. A video signal reproducing apparatus according to claim 3, wherein said field identifying means identifies the first and second field based on waveforms of the field image signals in a vertical synchronizing signal period.

6. A video signal reproducing apparatus for reproducing field image signals recorded on a first field of video signals and a second field of video signals on a recording medium comprising:

means for receiving from the recording medium the field image signals recorded on said first and second fields;

means for detecting successive receipt of field image signals recorded on a same field; and means for normally alternately scanning the field image signals of the first field at a scanning position of the first field and the field image signals of the second field at a scanning position of the second field, wherein rather than alternating between said first field and said second field, said scanning means successively scans a field image of the same field at an intermediate position of the scanning positions of the first field and second field when the detecting means detects a successive receipt of a field image signal of the same field.

7. A video signal reproducing apparatus according to claim 6, wherein said scanning means comprises means for inserting one of first synchronizing signal and second synchronizing signal to said field image signals, said first synchronizing signal corresponding to the scanning position of the first field and said second synchronizing signal corresponding to the scanning position of the second field.

8. A video signal reproducing apparatus according to claim 7, wherein said scanning means further comprises means for inserting an intermediate synchronizing signal, said intermediate synchronizing signal being produced by delaying one of the first synchronizing signal and the second synchronizing signal.

9. A video signal reproducing apparatus according to claim 6, wherein said successive receipt detecting means comprises means for identifying whether one field image signal corresponds to said first or second field and means for comparing the field identification result of said one field image signal with the result of that of an image signal immediately before said one field image signal.

10. A video signal reproducing apparatus according to claim 9, wherein said successive receipt detecting means further comprises a memory for storing the field identification result.

11. A video signal reproducing apparatus according to claim 9, wherein said field identifying means identifies the first and second field based on waveforms of the field image signals in a vertical synchronizing signal period.

* * * * *